US008813110B2

(12) United States Patent
Ng et al.

(10) Patent No.: US 8,813,110 B2
(45) Date of Patent: Aug. 19, 2014

(54) DUAL CHANNEL AUDIENCE CUSTOMIZED BROADCAST DELIVERY SYSTEM AND METHOD

(75) Inventors: Sheau Ng, Wayland, MA (US); Nagarajan Gopalakrishnan, Bangalore (IN)

(73) Assignee: NBCUniversal Media, LLC, Wilmington, DE (US)

( * ) Notice: Subject to any disclaimer, the term of this patent is extended or adjusted under 35 U.S.C. 154(b) by 509 days.

(21) Appl. No.: 12/635,326

(22) Filed: Dec. 10, 2009

(65) Prior Publication Data

US 2011/0145850 A1 Jun. 16, 2011

(51) Int. Cl.
*H04N 7/16* (2011.01)

(52) U.S. Cl.
USPC .................................. 725/14; 725/34; 725/10

(58) Field of Classification Search
USPC ............................................ 725/34, 14, 100
See application file for complete search history.

(56) References Cited

U.S. PATENT DOCUMENTS

2008/0002652 A1* 1/2008 Gupta et al. .................. 370/338
2008/0276270 A1* 11/2008 Kotaru et al. .................. 725/34
2009/0228361 A1* 9/2009 Wilson ............................ 705/14
2009/0249424 A1* 10/2009 Gordon et al. ................ 725/118
2012/0023522 A1* 1/2012 Anderson et al. ............... 725/35

* cited by examiner

*Primary Examiner* — Jivka Rabovianski
(74) *Attorney, Agent, or Firm* — Fletcher Yoder, P.C.

(57) ABSTRACT

The broadcast of content over a unidirectional broadcast channel is adjusted by analysis of data received from receivers of the content via a bidirectional data exchange channel. The broadcast may be altered in signal, signal strength, signal direction, encoding, and so forth. The receivers may communicate the data over any suitable network, such as the Internet. The data may include past, current and planned selections of content, as well as geographic and demographic information, when available.

21 Claims, 4 Drawing Sheets

FIG. 3
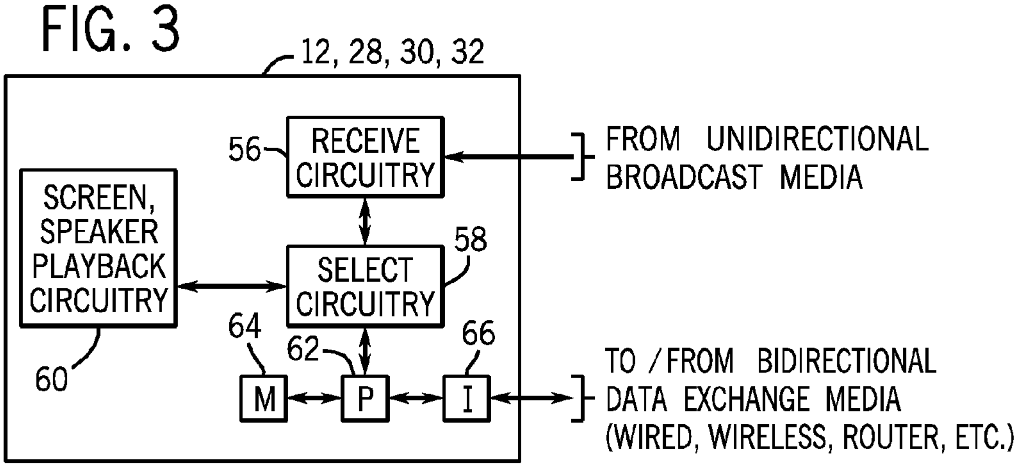
FIG. 4
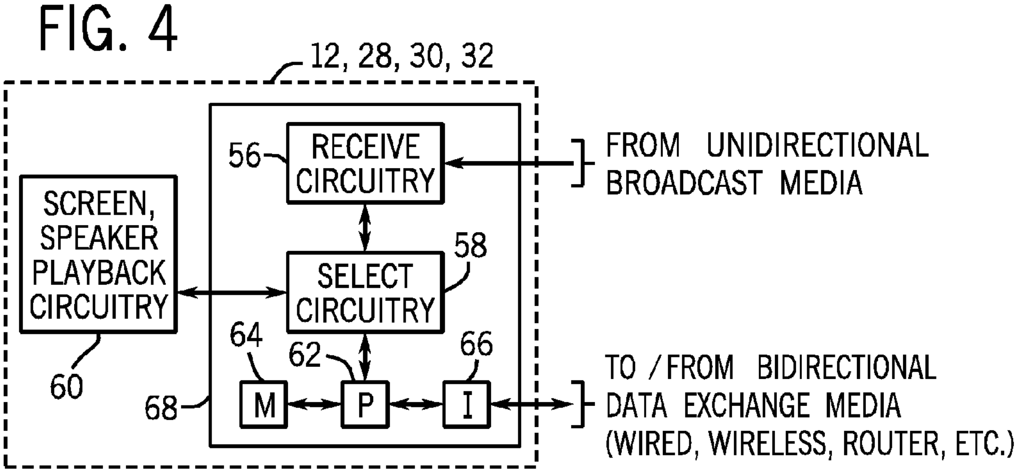
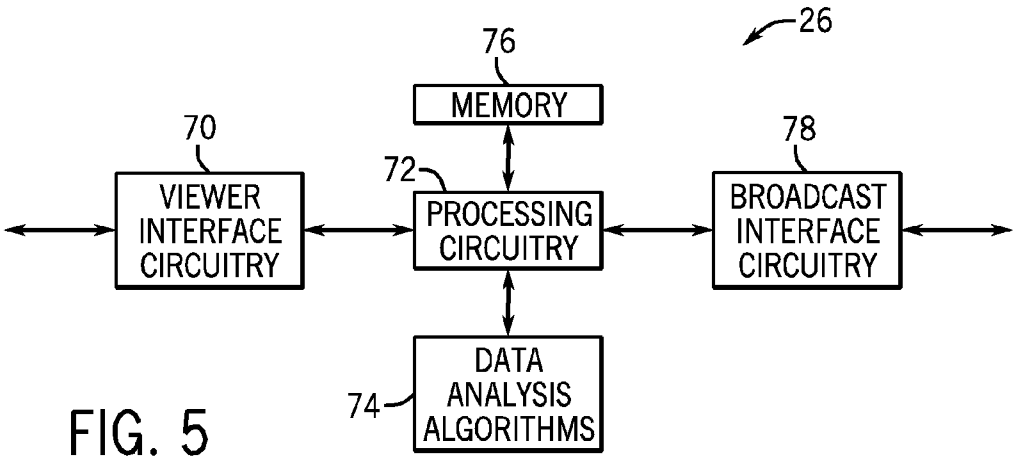
FIG. 5

DUAL CHANNEL AUDIENCE CUSTOMIZED BROADCAST DELIVERY SYSTEM AND METHOD

BACKGROUND OF THE INVENTION

The subject matter disclosed herein relates to the control of broadcast of media content. More particularly, the invention relates to tailoring the broadcast of such content collectively to one or more target populations based upon information received or drawn from individual receivers of the content.

Broadcast techniques have become increasingly sophisticated, and now include a wide range of physical media as well as strategies for delivery of content to its intended audience. For example, television content has been traditionally broadcast to all receivers within an area capable of receiving the broadcast signals. Currently available cable and satellite providers extend this conventional approach by providing a range of pre-scheduled programming options, commonly grouped in packages ranging from basic to premium, each of which may differ in the content provided and the costs charged to subscribers. Such paradigms are increasingly challenged by digital content offerings, such those provided on individual sites available over the Internet (with wired or wireless connections), and over cellular telephone or other networks.

Some of these technologies allow for interactive data exchange between the viewer and the content provider. This is particularly true of Internet and cellular-based content offerings. Similarly, specific subscriptions for particular programs may be made to satellite and cable content providers (e.g., so-called "pay-per-view"). However, these disparate approaches to content selection and delivery have not addressed broadcast media. That is, for completely individualized selection and delivery, such as via the Internet, individual viewers select content to be downloaded or streamed, and that particular content is provided to that particular viewer. The content and the manner in which it is provided are not altered by the user selection. Similarly, "television" programming selections made to satellite and cable providers are made and result in content delivery solely on an individualized based. That is, the selection of programs by one or more households in an area does not affect whether and how the signals for the content are collectively offered or delivered.

While such developments have dramatically changed the broadcast landscape, considerable gaps remain in and between these content delivery solutions. For example, extremely limited or no link is available between programming selections actually made by viewers (or listeners) of broadcast content and the content providers. For many years dedicated services, such as those performed by Neilsen Media Research and others, have allowed for monitoring of viewer selections and habits. However, this information has been used for very long-term planning (e.g., of broadcast season-scale investment in current and future program production). The information is not collected or processed in a manner to permit more immediate (e.g., during a broadcast) changes. Moreover, such information is not used to customize the entertainment experience of the individual audience participant.

The inventors have identified a need for improved media content delivery approaches that utilize the flexibility offered by individualized selectivity of programming by viewers, and the power provided by the ability to broadcast content collectively to a target audience. It is believed that such innovations may significantly alter the manner in which broadcast content is delivered, even by conventional media, such as for television broadcasts. The inventive approaches may thereby greatly enhance the ability to satisfy a collective audience based upon collectivization of preferences and selections by individuals within the audience.

BRIEF DESCRIPTION OF THE INVENTION

The present invention provides methods and systems for addressing such needs. The techniques offered by the invention allow for user selections and other information to be collected or received from individual receivers in an audience (e.g., a target population, regional group, etc.). The received information relates to selections or preferences among broadcast media content. The information is then analyzed for collective determinations (i.e., on the basis of more than one, and preferably many receivers). An operational parameter of a broadcast of a content stream is then altered based upon the analysis.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a diagrammatical illustration of certain of the functional components of an exemplary receiver for use in the present techniques;

FIG. 4 is a diagrammatical illustration of an alternative receiver implementation;

FIG. 5 is a diagrammatical illustration of certain functional components of an exemplary receiver data analysis system;

DETAILED DESCRIPTION OF THE INVENTION

Figure 1:
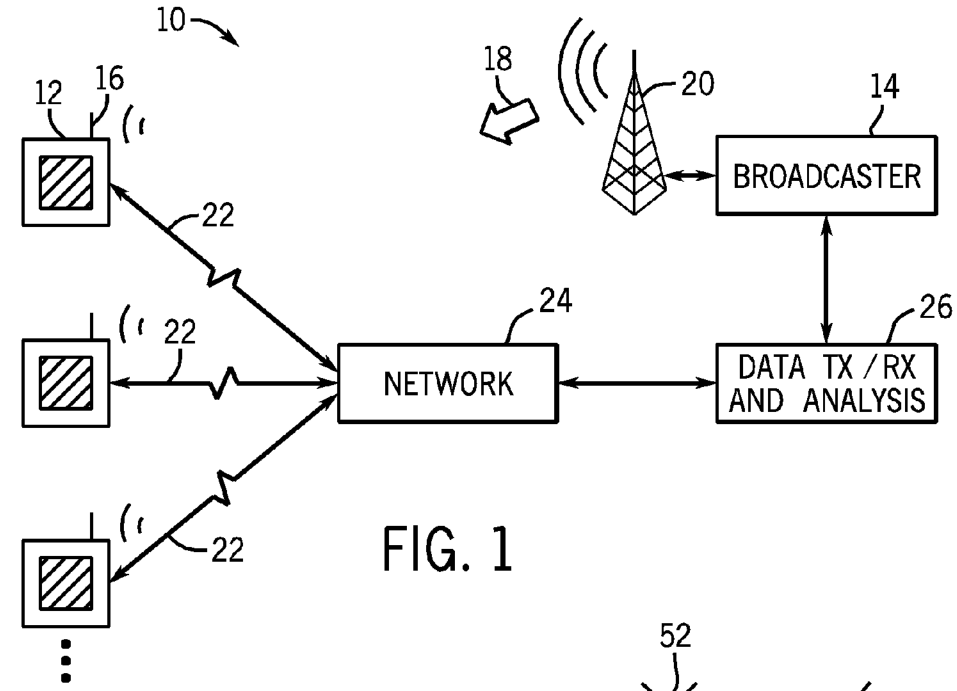
FIG. 1 is a diagrammatical overview of an exemplary content delivery system in accordance with certain aspects of the invention.

Turning to the drawings, FIG. 1 illustrates an exemplary content delivery system, designated generally by the reference numeral 10. In one presently contemplated embodiment, system 10 is designed to deliver multimedia content, such as television programming. Such content may include any conventional data streams, such as series programming, sports programming, movies, music, and so forth. The content is received and played on receivers 12, which may include conventional television sets, but that will be equipped for bidirectional data exchange with the broadcaster or an entity associated with the broadcaster. It should also be noted that such receivers, as described below, may comprise computers and various devices with processing capabilities such that they can receive and process signals into video, audio, multimedia and similar output. For example, the receivers may employ techniques such as so-called software defined radio ("SDR"), as well as other signal processing technologies.

Such devices are currently available under various names, and are sometimes referred to as "Internet-ready televisions." However, as noted below, the receivers themselves may include integrated circuitry for this purpose, or may be capable of reception or even of playback only, and placed in communication with other devices that are themselves equipped for data communication. Such devices may be of the type sometimes referred to as "set-top boxes", although any suitable device may be used for this purpose, including application specific and general purpose computers.

The receivers 12 receive the broadcast content from a broadcaster 14. In one presently contemplated embodiment, the broadcaster 14 is a conventional television broadcast entity emitting program content in a continuous stream. The broadcaster may, in some instances, emit multiple streams of content simultaneously. In practice, many arrangements and business models may be involved in defining the "broadcaster", and in the case of television networks, these may include an entity that creates or provides certain content and entities dispersed geographically ("local stations") that receive the content and perform the actual broadcast over a portion of the electromagnetic spectrum attributed to the broadcaster. In practice, the broadcaster 14 may be only one of many broadcasters that simultaneously and in parallel emit content that may be selected by individual viewers via their respective receivers 12. In conventional parlance, the viewers may "dial a channel" on the receiver to select the content from the broadcaster. "Broadcasters" in the present context may also include so-called "multiservice operators" ("MSO's") that output many broadcast content streams in parallel to potential audiences.

In the embodiment illustrated in FIG. 1, each receiver 12 includes some type of reception channel 16 designed to receive unidirectional content 18 from the broadcaster, typically emitted by an antenna 20. This use of the term "channel" should not be confused with the program selection made by the viewer on the receiver tuning device (e.g., set control, remote control, etc.). The broadcast "channel" is, instead, a data transmission channel that serves to carry and deliver a signal stream from the broadcaster to the individual receivers. This data transmission channel is unidirectional, meaning that the receivers can receive, decode and playback content from the broadcaster, but the broadcaster cannot receive data from the individual receivers, or exchange data with the receivers via this broadcast channel.

However, the receivers are equipped with a second channel for bidirectional data exchange. This channel is represented generally by reference numeral 22 in FIG. 1. As discussed in greater detail below, this channel may be configured on various ways, such as for communication over telephone lines, cable lines, wireless transmission networks, and so forth. In presently contemplated embodiments, this channel will include an Internet connection such that the receivers 12, or a device integrated with or connected to each receiver can receive and transmit data via the Internet. For example, the receiver may be attributed an IP address, and exchange data with sites of the Worldwide Web via an Internet service provider (not represented separately in the figures). In general, then, the bidirectional data exchange channels 22 will connect to a network 24 for two-way communication of data.

A data analysis system, represented generally by reference numeral 26 is also connected to the network 24 to receive data from (and where desired to provide data to) the receivers 12 via the bidirectional data exchange channels 22 in parallel with the broadcast channels 16. As discussed in detail below, various data may be sent by, or solicited from the receivers that is analyzed by system 26. In presently contemplated embodiments, this data may include which program is currently selected (i.e., being viewed) by the receivers, the state of the receivers (i.e., on or off), historical program selections, program selection listing preferences (e.g., setup of program guide menus as altered or customized by the viewer), settings for current or future recording of program selections, special orders of present and/or future program offerings, and so forth. Moreover, the data may include or exclude personal information about the viewer. In presently contemplated embodiments the viewer may be provided with an opportunity to "opt out" or otherwise disallow such data gathering, or conversely, the system may default to an "opt out" but allow the viewer to set an "opt in" parameter by which the desired data may be sent to the analysis system 26 or drawn by the system from the receiver. Various opt out and opt in processes may be envisioned, including "one time" opt ins or opt outs (e.g., at the time a receiver installed or a service is initiated, temporary opt ins and opt outs (e.g., in real time when selected by a user of a receiver), or at any time between (e.g., by configuration or reconfiguration of a profile). Moreover, the system may be adapted to permit opt in or opt out for particular data or offering sources, types and so forth. The data may also include demographic information, if available, such as the viewer or household preferences, interests, likes and dislikes, discretionary filtering desires (e.g., against explicit content), and so forth. Also, the data will preferably include or permit determination of a geographic location of the receivers, which may be quite specific, or general (e.g., neighborhood, region, area, metropolitan agglomeration, etc.). It should be noted that some of this information may be accessed from other sources (not separately represented) that store the information and associate it with data that is gathered from the receivers. That is, such information may provide information or insights into context, location, and behavior of a user of a receiver, such as a viewer profile, viewing history, preferences, current and past program orders, geographic locations, signal strength, multipath data, and so forth may be stored in a data repository that can be accessed by the analysis system 26 (or that may be part of the system) to perform the desired analyses based on the data received from the receivers.

As will be described in greater detail below, the system 10 is adapted to adjust one or more parameters of the content broadcast based upon the data received from individual receivers. For example, if the analysis system detects that viewers in a particular geographic area want to view or are viewing a particular program, while viewers in another area are not, parameters controlling signal strength, signal direction, and so forth may be changed. Such alterations may be highly flexible, allowing for real time or near real time adjustment in the broadcast, with further alterations being made as the data indicate changes in viewing or program selection patterns. In other cases, the alterations may be planned, such as to change, supplement or otherwise alter coding or encryption of the content signal, or even to change the program offerings themselves (e.g., in case of higher demand, changing or forecast viewer preferences, etc.).

Figure 2:
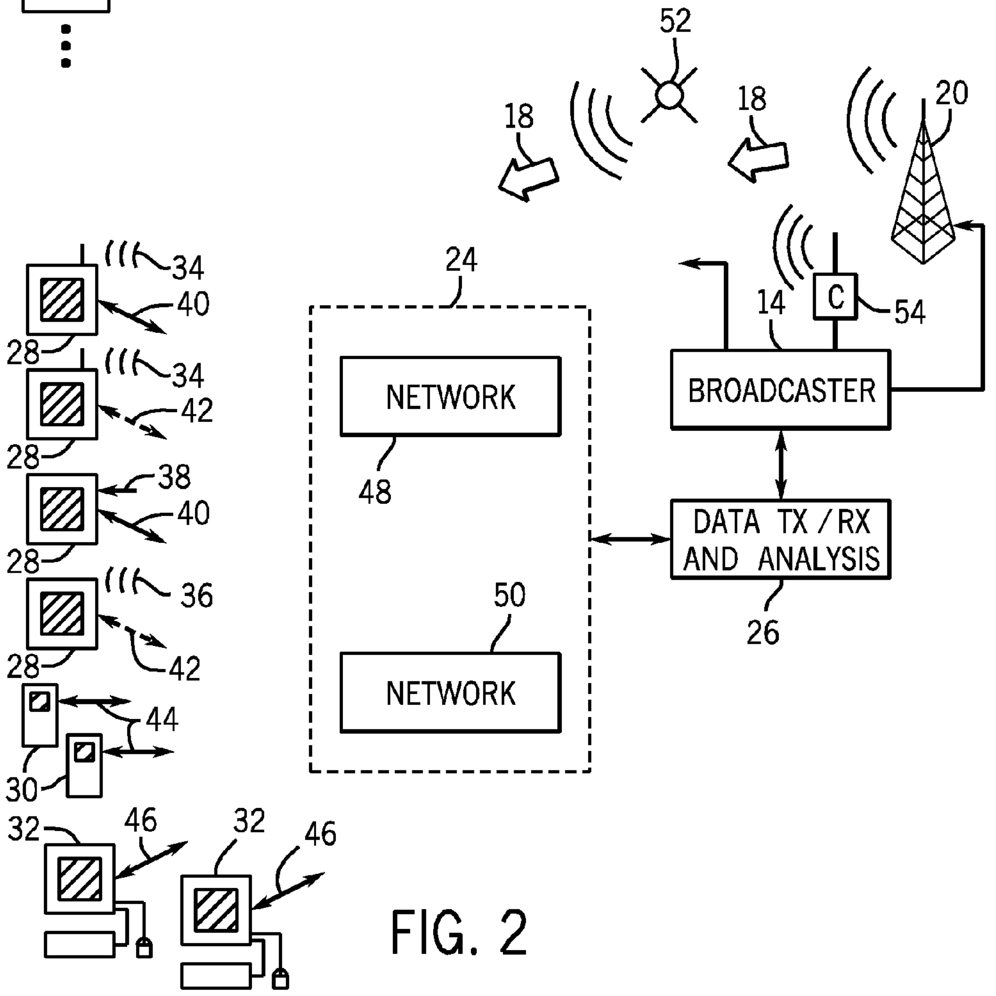
FIG. 2 is a somewhat more detailed representation of a similar content delivery system utilizing various unidirectional delivery technologies and illustrating several possible bidirectional data exchange approaches.

As noted, in a presently contemplated embodiment, the invention provides for adjustment of broadcast parameters, such as for traditional television broadcasts, where the broadcaster cannot receive or detect information about viewer selections over the same data channel used to provide the content (i.e., the portion of the electromagnetic spectrum used for the broadcast). However, other paradigms are also envisioned for the present technique, as illustrated in FIG. 2. By way of example, these may include receivers that are television systems 28, telephones, personal digital assistants, and so forth, 30, and personal computer systems 32. Some or all of these may be stationary (e.g., fixed in a household, hotel, etc.), while others may be mobile, such as in the case of telephones, but also including receivers in automobiles, aircraft, and so forth. Moreover, both the unidirectional broadcast media and the bidirectional data exchange media may vary. In the illustrated embodiment, the broadcast media may include conventional terrestrial broadcast spectra 34 (e.g., reserved for television, radio, etc.), as well as satellite broadcast spectra 36, and cable connections 38 (including telephony and multi-purpose cabling). The bidirectional data exchange media may include wired connections 40, wireless connections 42, cellular connections 44, and conventional Internet connections 46. It should be appreciated that certain of the receivers may have various combinations of these, and in many instances, may have facilities for receiving content by two or more unidirectional channels and for exchanging data bidirectionally by two or more bidirectional channels.

Further, the network referred to generally by reference numeral 24 may include separate networks 48 and 50, as in the case of an Internet connection through a Internet service provider, and a separate cellular connection through a cellular service provider. Of course, the networks may include wired or wireless networks at the receiver location (e.g., a wired or wireless LAN), wide area networks, virtual private networks, and so forth.

Similarly, where broadcast media other than the traditional television "airwave" delivery system is used, the broadcaster may include or control devices for such media. For example, as represented diagrammatically in FIG. 2, the broadcaster may unidirectionally transmit the content via a satellite 52 or cable network, a cellular transmission system 54, and so forth. When the broadcaster itself does not own or control such devices, it may work in conjunction with entities that do in order to adjust or adapt the transmission parameters as set forth herein. In such cases, for the present purpose, the satellite signal provider, the cable signal provider, the cellular provider, and so forth should be understood as part of the general reference to "broadcaster".

It should be particularly noted that the "broadcast" of content, in the present context, refers to the dissemination of content to a potential audience made up of many receivers without regard to selection of any particular content stream by any particular receiver. That is, the broadcast is not, itself, individualized. Individual receivers receive the same content that is broadcast to all. This will, in certain network paradigms, be performed over completely separate media, such as wirelessly over a portion of the electromagnetic spectrum, as in conventional television. However, it may also be performed over media that are themselves capable of bidirectional communication, but that are not used in this manner for the broadcast of the content. For example, even if some satellite, cable, wired telephony, cellular telephony, or Internet-based media may be used for two-way communication, the "broadcast" of a content stream, as referred to herein is performed over such media without regard to how, when or even whether any particular receiver is "tuned into" or has selected the content stream as opposed to other streams or nothing at all. By way of further example, in many Internet-based content delivery systems, transmit content only when specifically requested or selected to a specific recipient. Such so-called "on-demand", recipient-specific delivery is not considered "broadcast" in the present context. Similarly, however, the term "stream" should not be read as limiting insomuch as it may refer to continuous, multiplexed, discretized, or packetized transmissions, or any other approach to the dissemination of the content.

It should also be noted that the present techniques are intended to apply to various types of "content" and "media content". Where reference is made in the present discussion to "multimedia content" or to "content" or to "media content", this should be broadly construed. That is, while conventional television programming typically involves the delivery of signals that are translated into images (particularly moving images) and sound. The "content" or "media content" broadcast and analyzed by the present invention certainly includes such programming. However, "content" and "media content" may also include transmissions in accordance with other technologies, as described herein, as well as images alone (still and moving), sound alone, and so forth. Moreover, the "content" and "media content" may include renderings produced by so-called "late binding", and similar techniques, in which some or all of the data needed for the rendering is transmitted or stored separately from other data, and the data elements are combined at or near the point of rendering (e.g., in the receiver or a component coupled to the receiver).

FIG. 3 is a diagrammatical representation of an exemplary receiver that might be used in conjunction with the present techniques. In this embodiment, the receiver, which may correspond to any one of the receivers 12, 28, 30 and 32 discussed above, will include signal reception circuitry 56 and program selection circuitry 58. In the case of conventional television broadcast media, the reception circuitry will include an antenna and decoding circuitry for transforming the received signals into a viewable image and/or audible sound. The selection circuitry 58 may include an on-set dial or buttons, or a remote control that allows the user to select the one program (content stream) for viewing and/or listening as opposed to others received or receivable by the signal reception circuitry 56. Playback circuitry 60 is coupled to the signal reception circuitry and to the selection circuitry to allow the signals to be transformed for viewing and listening. It should be noted that the present techniques may be used for image programming only, or audible programming only, but is particularly well suited to multimedia programming. The circuitry used for reception of the signals, selection of the programming or content, and for playback may be conventional in nature. Moreover, these may include processing and memory circuitry (not separately shown) for recording and later playback of content.

Processing circuitry 62 allows for access and at least some processing of data available within the receiver, while program code executed by the processing circuitry 62 may be stored on the processing circuitry itself (if available) or on separate memory circuitry 64. The data accessed and processed may include any and all of the data discussed above with reference to FIG. 1, and will preferably include the current program selection made by the viewer. Interface circuitry 66 is coupled to the processing circuitry and allows for bidirectional data exchange as discussed above.

FIG. 4 represents one of many possible alternatives for the configuration of the receiver. In this embodiment, the playback circuitry 60 is separate from the other functional components, such may be provided in a "set-top box" 68, or the like. Several types of such devices presently exist and others will likely come into being during the useful life of the present techniques. Such devices provide for reception of the broadcast signals (by their own circuitry 56), selection of program content (by circuitry 58), and processing, storing and interfacing functions (by their own circuitry 62, 64 and 66). In some cases, these functional circuits may be complementary to those provided in the playback circuitry itself. In other cases, the playback circuitry may comprise a simple monitor, speaker, or the like capable only of signal conversion and content rendering.

FIG. 5 illustrates certain functional components of a presently contemplated receiver data analysis system 26. As discussed above, the system will receive signals from multiple receivers (preferably from entire populations or target audiences). Viewer interface circuitry 70 is provided for this purpose. Such circuitry may include conventional servers and interfaces for sending queries, handshakes, data requests and so forth to the receivers, and for receiving encoded data (in response or upon receiver initiation). Such bidirectional transmissions may be made in accordance with any suitable protocol, such as Internet protocol (IP), transmission control protocol (TCP), hypertext transfer protocol (HTTP), file transfer protocol (FTP), and so forth. Processing circuitry 72, which will typically include one or more programmed computers or servers, received and analyzed the data. Algorithms for such analysis will typically be embodied in program code, as indicated by reference numeral 74. This code may be stored in the processing circuitry memory (if available), or may be separately stored in system memory 76. The results of such analysis will also be stored for retrieval, archival purposes, and so forth, although in certain embodiments it will also serve for real time or near real time adjustments in broadcast parameters. Finally, the analysis system will be provided with broadcast interface circuitry 78 designed to allow the analysis results (and where desired the raw or processed data) to be provided to the broadcaster. It should be noted, however, that in certain embodiments, the analysis system 26 may be part of the broadcaster itself. Moreover, the broadcaster may have or draw from more than one such analysis system 26, such as in different geographical regions. Further, where desired, the analysis may be performed by an entirely different entity, such as an Internet, cellular, connectivity or another service provider, and provided to the broadcaster for the purposes described herein.

Figure 6:
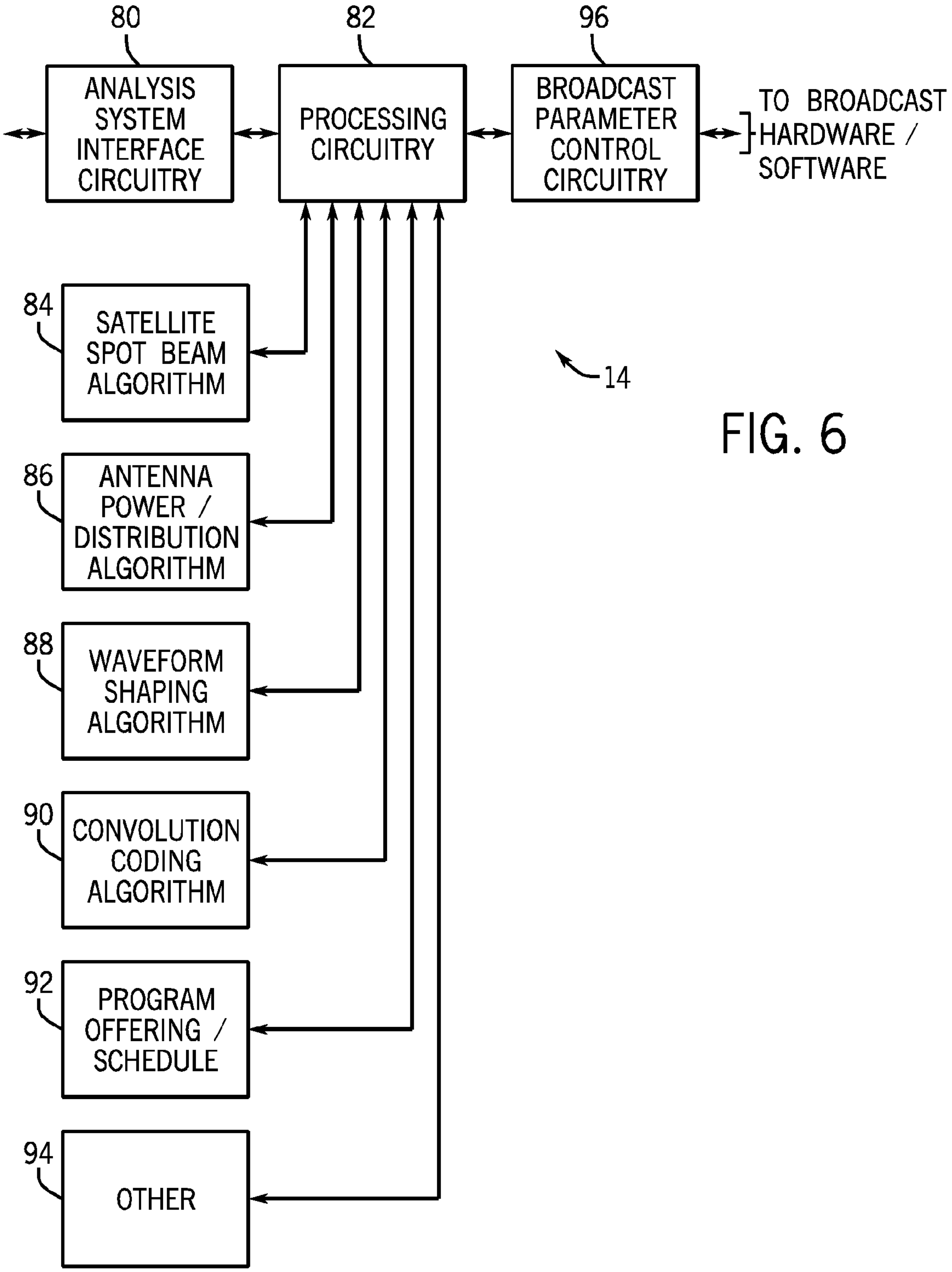
FIG. 6 is a diagrammatical illustration of certain functional components of an exemplary broadcast system designed to alter at least one parameter of content broadcast based upon analysis of receiver data.

FIG. 6 is a diagrammatical representation of certain functional components of the broadcaster, some or all of which may be present for adjusting broadcast parameters for a collective audience of viewers based upon receiver data from individual viewers. The broadcaster system will include interface circuitry 80 for interfacing with the analysis system described above. If the analysis system is integral to the broadcaster, such circuitry may include an internal network and network components. Alternatively, the circuitry may allow for data exchange (preferably secure) between the analysis system and the broadcaster. Data may be transmitted in real time, near real time, or on a periodic or even on-request basis. Thus, the broadcast parameters may be altered in response to changes in viewing selections on a collection of receivers, or changes may be planned based upon anticipated interest or demand.

Processing circuitry 82 receives the data representative of the receivers and their selections, and executes one or more analysis or process control algorithms for determining which, if any, broadcast parameters should be altered. FIG. 6 represents several presently contemplated examples of such algorithms.

For example, a satellite spot beam algorithm 84 that allows for determination of parameters that control concentration of power (e.g., sent by a high-gain antenna), typically covering only a limited geographic area. By use of such algorithms, the processing circuitry may determine settings for a satellite broadcast so that only receivers in a particular intended reception area can receive the broadcast content, or that the signal strength or quality will be particularly enhanced in such reception areas. Such adjustments may be made in response to the analysis revealing that a particular target audience is particularly interested in particular content (e.g., a city or region receiving transmission of a sports match featuring a home-town team).

Similarly, the algorithms may include an antenna power or power distribution algorithm 86. Such algorithms may allow for determination of parameters used for directional antenna settings, radiation power, antenna gain (e.g., in a given direction) and so forth. These may, in turn, be used to regulate operation of one or more transmission towers or antennae used to broadcast the content, again in response to individual selections made or anticipated by receivers, analyzed on a collective basis.

Further the algorithms may include a waveform shaping algorithm 88. Such waveform shaping may include control of the waveform of transmitted pulses, such as to adapt the transmitted signals to suit the communication channel by limiting the effective bandwidth of the transmission. This may permit the broadcaster to improve the reception quality (e.g., signal-to-noise ratio) by the use of various filters configured via the analysis carried out by the algorithm.

Another potential algorithm is a cryptographic coding algorithm 90. As will be appreciated by those skilled in the art, cryptographic coding involves the transformation of the signals representative (or that may be decoded to provide a representation) of the content into a bitstream for transmission. Parameters adjusted as a result of application of the algorithm may include the selection of an encoding scheme that allows for "clear" decoding of specific content (e.g., viewing without specific payment), or for pay-per-view type coding, requiring a pecuniary arrangement with the broadcaster or other provider for viewing. Many different encryption schemes are presently in use and under development, and this algorithm may allow for selection of a suitable scheme depending upon whether a segment of the viewing population is currently viewing or desires to view certain content. The processing based upon such algorithms may include determination of whether the receivers are currently capable of decoding such broadcasts, and even whether updates or new decoding routines should be downloaded to the receivers.

As represented by reference numeral 92, the algorithms may also allow for altering program offering and scheduling. For example, based upon receiver data (e.g., indicating popularity or unpopularity of certain content), program offerings may be altered from existing schedules, or schedules may be changed to accommodate the detected preferences. Such changes may, for example, affect a schedule or target audience in a specific geographical area as opposed to other areas where interests differ.

Finally, FIG. 6 indicates that "other" algorithms may be drawn upon to alter the broadcast parameters. Many improvements and alternative algorithms may be developed once the present technique is put into place, and depending upon the type and quality of the receiver data available to the broadcaster. For example, unidirectional broadcast of commercials and other advertising may be adapted based upon the bidirectional data exchange with the receivers. Such alterations may more effectively span a present gap between somewhat untailored dissemination of television advertising by unidirectional broadcast alone, and the highly specialized (fully individualized) provision of advertisements on Internet web sites.

Based upon the determinations made by the processing circuitry 82, the broadcaster will alter one or more parameters of the broadcast via broadcast parameter control circuitry 96. This circuitry may include any and all conventional broadcast components, including encoders, amplifiers, signal processing circuitry, antenna drive circuitry, and so forth.

Figure 7:
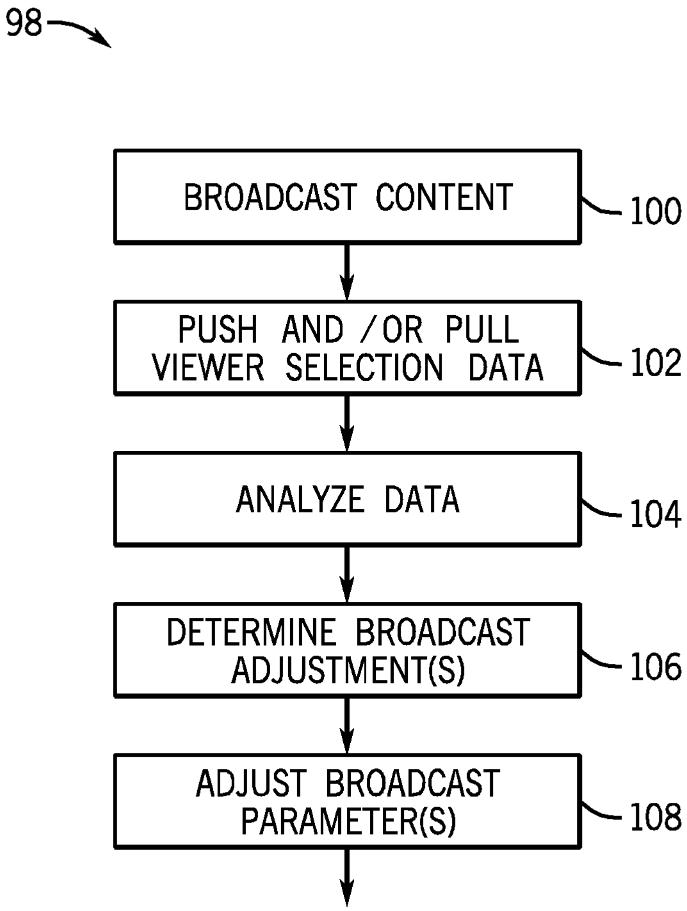
FIG. 7 is a flow chart illustrating certain steps in a presently contemplated algorithm for tailoring broadcast parameters based upon analysis of receiver data.

FIG. 7 summarizes certain exemplary steps in the process discussed above. The process, designated generally by reference numeral 98, may begin with the broadcast of content, as indicated by block 100. At block 102, then, receiver data is received from the individual receivers, or drawn from the receivers by the data analysis system. As noted above, a wide range of data may be collected in this way, although this data preferably includes current, past and/or future selections of programming by the receivers. As also noted above, the data will usefully include geographic data, demographic data, or data capable of allowing the analysis system to determine such data (e.g., subscriber data that can direct the system to a database with the desired geographic data, demographic data, etc.).

At block 106, the broadcaster determines one or more adjustments to be made to broadcast parameters. This may be performed by any suitable analysis and/or control algorithm, including those discussed above. Finally, at block 108, these parameters are adjusted to accomplish the goals of the broadcaster in serving the target audience.

It should be noted that the order of steps illustrated in FIG. 7 may be altered, and that the process itself will typically be ongoing and repeated. For example, the processing illustrated in FIG. 7 should be understood to allow for real time or near real time changes in the broadcast parameters (e.g., changes in response to receiver data for an ongoing broadcast of content begun at block 100). However, the process also allows for collection and analysis of data for altering broadcast parameters before the dissemination of particular content, such as in response to known or determined viewer preferences, preferences in a particular area, past and planned viewing selections, and so forth. In this way, the "broadcast content" block 100 may follow the data collection, analysis and adjustment blocks.

Technical effects of the invention include the ability to alter broadcast parameters for unidirectional broadcast channels in response to data from receivers transmitted over bidirectional data communication channels. The ultimate effects may include greater and more directed targeting of content and broadcast resources to more usefully satisfy the actual desires of the receiving audience as determined by the received data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for broadcasting multimedia content to a target population comprising:

receiving data from a plurality of individual receivers of the target population via a bidirectional data exchange protocol; and adjusting a parameter of a collective unidirectional broadcast of the multimedia content directed to at least the receivers of the target population based upon the received data and without regard to whether any of the individual receivers have then selected the collective unidirectional broadcast to after reception, quality, or signal strength for the target population;

wherein adjusting the parameter at least partially controls how or where the collective unidirectional broadcast is transmitted and wherein the adjusted parameter comprises broadcast antenna power or power distribution.

2. The method of claim 1, wherein the received data comprises data indicative of one or more program settings of the receivers of the target population.

3. The method of claim 2, wherein the plurality of receivers comprise television receivers, and the data indicative of one or more program settings comprises data indicative of a television channel selected on the television receivers.

4. The method of claim 1, wherein the target population is defined at least partially based upon a geographic area.

5. The method of claim 1, wherein the adjusted parameter comprises a waveform shaping parameter.

6. The method of claim 1, wherein the adjusted parameter comprises a convolution coding parameter.

7. The method of claim 1, comprising also adjusting a schedule of one or more program offerings based upon the received data.

8. The method of claim 1, comprising receiving the data from the plurality of individual receivers into a first entity, and adjusting the parameter of the collective unidirectional broadcast via a different second entity in communication with the first entity.

9. The method of claim 1, wherein the bidirectional data exchange protocol comprises an Internet protocol.

10. A method for broadcasting multimedia content to a target population comprising:

via a bidirectional data exchange protocol, receiving data from a plurality of individual receivers of a target population indicative of selection of one of a plurality of available television content streams;

analyzing the received data to identify at least one preferred selection; and adjusting a parameter of a broadcast directed to the receivers of the target population based upon the at least one preferred selection and without regard to whether any of the individual receivers have then selected the broadcast to after reception, quality, or signal strength for the target population;

wherein the target population is defined at least partially based upon a geographic area and wherein the adjusted parameter comprises broadcast antenna power or power distribution.

11. The method of claim 10, wherein the target population is defined at least partially based upon a geographic area.

12. The method of claim 11, wherein the adjusted parameter comprises a waveform shaping parameter.

13. The method of claim 11, wherein the adjusted parameter comprises a convolution coding parameter.

14. The method of claim 11, comprising also adjusting a schedule of one or more program offerings based upon the at least one preferred selection.

15. The method of claim 11, comprising receiving the data from the plurality of individual receivers into a first entity, adjusting the parameter of the broadcast via a different second entity in communication with the first entity.

16. The method of claim 11, wherein the bidirectional data exchange protocol comprises an Internet protocol.

17. A system for broadcasting multimedia content to a target population comprising:

a receiving system configured to be coupled to a plurality of individual receivers of the target population via a bidirectional data exchange protocol, and to receive data from the individual receivers indicative of selection of one of a plurality of available multimedia content streams;

an analysis system configured to analyze the received data to identify at least one preferred selection; and a broadcaster system configured to adjust a parameter of a broadcast directed to the receivers of the target population based upon the at least one preferred selection and without regard to whether any of the individual receivers have then selected the broadcast, wherein the parameter adjusted by the broadcaster system at least partially controls how or where the broadcast is transmitted.

18. The system of claim 17, wherein the plurality of individual receivers comprise television receivers, and the data from the individual receivers indicative of selection of one of a plurality of available multimedia content streams comprises data indicative of a television channel selected on the television receivers.

19. The system of claim 17, wherein the broadcaster system includes an antenna for wireless broadcast, and wherein the adjusted parameter comprises at least one of broadcast antenna power, power distribution, and a waveform shaping parameter.

20. The system of claim 17, wherein the adjusted parameter comprises a convolution coding parameter.

21. The system of claim 17, wherein the broadcaster system is configured to also adjust-scheduling of one or more program offerings based upon the identification.

* * * * *